US011916336B2

(12) United States Patent
DeWitte et al.

(10) Patent No.: US 11,916,336 B2
(45) Date of Patent: Feb. 27, 2024

(54) BI-DIRECTIONAL HEADER FOR MULTI-DIRECTION CONNECTOR MATING

(71) Applicant: TE Connectivity Services GmbH, Schaffhausen (CH)

(72) Inventors: Thomas Robert DeWitte, Troy, MI (US); Adam Price Tyler, Troy, MI (US); Lindsey Gatesman, Winston Salem, NC (US); David James Rhein, Troy, MI (US)

(73) Assignee: TE Connectivity Solutions GmbH (CH)

( * ) Notice: Subject to any disclaimer, the term of this patent is extended or adjusted under 35 U.S.C. 154(b) by 190 days.

(21) Appl. No.: 17/505,991

(22) Filed: Oct. 20, 2021

(65) Prior Publication Data

US 2022/0140540 A1 May 5, 2022

Related U.S. Application Data

(60) Provisional application No. 63/109,818, filed on Nov. 4, 2020.

(51) Int. Cl.
*H01R 13/6582* (2011.01)
*H01R 13/58* (2006.01)
(Continued)

(52) U.S. Cl.
CPC ..... *H01R 13/6582* (2013.01); *H01R 13/5841* (2013.01); *H01R 13/639* (2013.01); *H01R 13/02* (2013.01); *H01R 13/502* (2013.01); *H01R 13/5202* (2013.01); *H01R 13/629* (2013.01); *H01R 13/62905* (2013.01); *H01R 13/62933* (2013.01); *H01R 13/62938* (2013.01); *H01R 13/64* (2013.01); *H01R 13/6456* (2013.01); *H01R 24/005* (2013.01); *H01R 24/52* (2013.01); *H01R 25/006* (2013.01); *H01R 33/76* (2013.01);
(Continued)

(58) Field of Classification Search
CPC ............ H01R 13/6582; H01R 13/5841; H01R 13/639; H01R 13/02; H01R 13/502; H01R 13/5202; H01R 13/629; H01R 13/62905; H01R 13/62933; H01R 13/62938; H01R 13/64; H01R 13/6456; H01R 24/005; H01R 24/52; H01R 25/006; H01R 33/76; H01R 33/7657; H01R 33/7671
See application file for complete search history.

(56) References Cited

U.S. PATENT DOCUMENTS 6,371,771 B1 * 4/2002 Fan ........................ H01R 24/62 439/660
2019/0288453 A1 * 9/2019 Blake ................. H01R 13/6683

* cited by examiner

*Primary Examiner* — Abdullah A Riyami
*Assistant Examiner* — Justin M Kratt

(57) ABSTRACT

An electrical header for use in an electrical connector assembly includes a body for mounting to an object and having an opening formed therethrough for receiving an electrical terminal. The body further defines a plug on a first side thereof for engaging with a mating electrical connector of the assembly. The plug includes a pair of first opposing sidewalls extending from the body at a first height and defining a locking feature for engaging with a corresponding locking feature of the mating connector, and a pair of second opposing sidewalls extending from the body at a second height, less than the first height. The first and second pairs of opposing sidewalls are adapted to mate with a first mating connector oriented in a first direction, and mate with a second mating connector oriented in a second direction distinct from the first direction.

20 Claims, 6 Drawing Sheets

(51) Int. Cl.

| | |
|---|---|
| ***H01R 13/639*** | (2006.01) |
| *H01R 13/52* | (2006.01) |
| *H01R 24/52* | (2011.01) |
| *H01R 13/629* | (2006.01) |
| *H01R 13/645* | (2006.01) |
| *H01R 13/64* | (2006.01) |
| *H01R 24/00* | (2011.01) |
| *H01R 13/502* | (2006.01) |
| *H01R 25/00* | (2006.01) |
| *H01R 13/02* | (2006.01) |
| *H01R 33/76* | (2006.01) |

(52) U.S. Cl.
CPC ...... *H01R 33/7657* (2013.01); *H01R 33/7671* (2013.01)

BI-DIRECTIONAL HEADER FOR MULTI-DIRECTION CONNECTOR MATING

CROSS-REFERENCE TO RELATED APPLICATIONS

This application claims priority to U.S. Provisional Application No. 63/109,818, filed on Nov. 4, 2020, the entire disclosure of which is incorporated by reference herein.

FIELD OF THE INVENTION

The present disclosure relates to electrical connectors, and more particularly, to an electrical header configured to mate with a corresponding mating connector in multiple directions.

BACKGROUND

Electronic components are often housed or packaged separately from a remainder of a larger electrical system in which they are utilized, promoting ease of integration and improved protection of sensitive components from harsh environmental conditions. As a result, the components must be electrically interconnected with other elements of the system. These connections are often implemented via wires or cables joining various components using complementary electrical connectors, including device-mounted headers. Currently, many of these connectors are limited to use in a single configuration or application. For example, electrical headers are typically directional in nature, or configured to connect to a corresponding mating electrical connector in a single orientation. In the case of a directional mating connector, for example, a right-angle or 90-degree mating connector, an extension direction of the wiring exiting the mating connector is limited to the orientation defined by the header. However, it may be desired to change the orientation of these connections, and thus the resulting wire paths, for any number of reasons including system packaging. With headers of the prior art, changing this connector and wiring direction requires not only the step of rotating the header on the device to which it is mounted, but more significantly, redesigning the interface defined on the device to accept the header in the updated or rotated position. These device-side alterations are costly as well as time consuming.

Accordingly, there is a need for improved electrical connector assemblies that provide additional application flexibility and configurability, particularly regarding connector orientation.

SUMMARY

In one embodiment of the present disclosure an electrical header for use in an electrical connector assembly includes a body for mounting to an object or device. The body defines an aperture formed therethrough for receiving at least one electrical terminal. The body further includes a plug end on a first side thereof for engaging with a complementary mating end of a mating electrical connector of the assembly. The plug end comprises a first pair of opposing sidewalls extending from the body to a first height and defining one or more locking features for engaging with corresponding locking feature(s) of the mating connector. The plug end further comprises a second pair of opposing sidewalls extending from the body to a second height, less than the first height. The plug end is generally shaped such that the header is mateable with a first mating connector oriented in a first direction with respect to the header, and a second mating connector oriented in a second direction with respect to the header, distinct from the first direction.

In another embodiment of the present disclosure, an electrical connector system includes a header having a plug portion extending therefrom for engaging with a complementary mating connector in two distinct orientations. The system further comprises a first mating connector mateable with the header in a first orientation, and a second mating connector mateable with the header in a second orientation, distinct from the first orientation.

BRIEF DESCRIPTION OF THE DRAWINGS

The invention will now be described by way of example with reference to the accompanying Figures, of which.

DETAILED DESCRIPTION OF THE EMBODIMENTS

Figure 1:
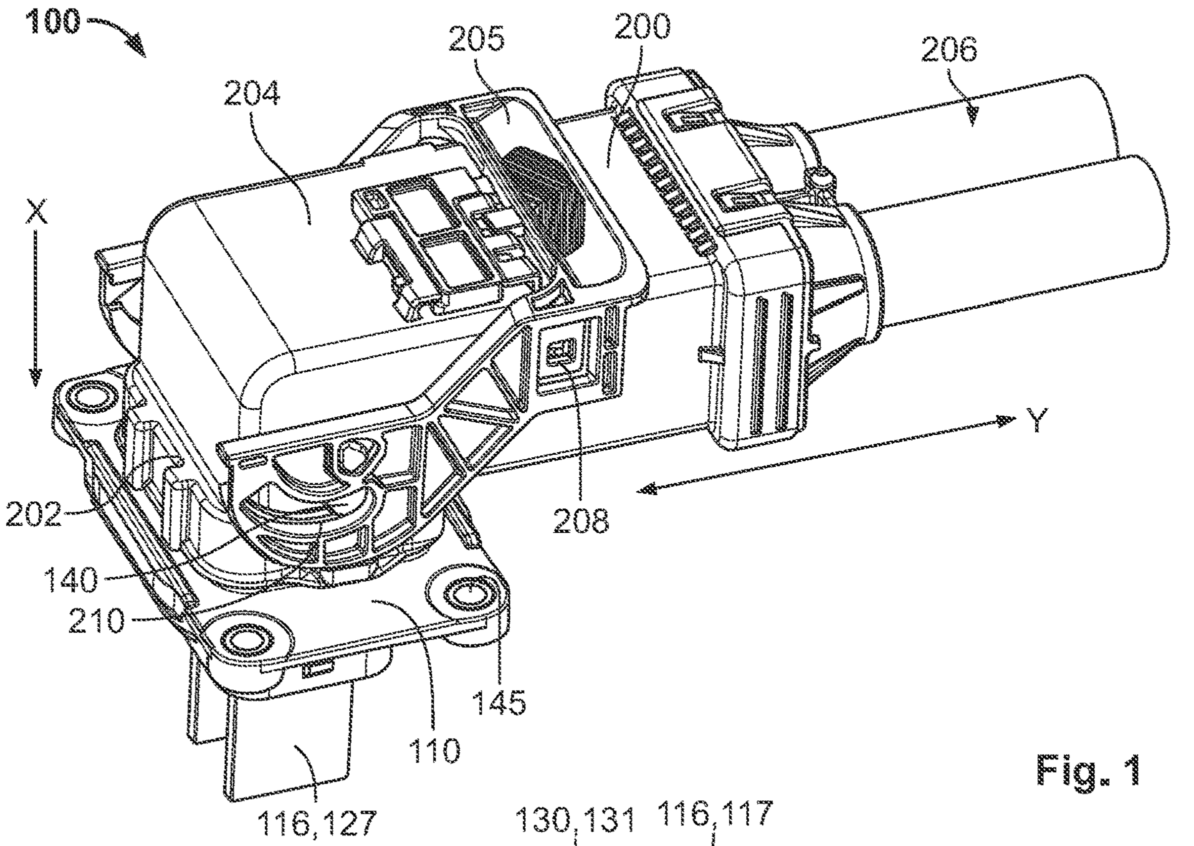
FIG. 1 is a side perspective view of an electrical connector assembly including a header and a first mating connector according to an embodiment of the present disclosure.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth in order to provide a thorough understanding of the disclosed embodiments. However, it is apparent that one or more embodiments may also be implemented without these specific details.

Embodiments of the present disclosure include an electrical header mountable to an object, such as a housing of an electronic component. The header includes a body defining a plug on a first side thereof configured to mate with a corresponding mating connector oriented in a plurality of different positions or orientations. For example, the plug is adapted to receive a first mating connector having a first orientation with respect to the plug, and receive a second mating connector having a second orientation with respect to the plug, distinct from the first orientation. In this way, a single common header according to embodiments of the present disclosure may be used to accommodate or mate with multiple mating connector types, expanding wiring capabilities (e.g., connector direction and wire path direction), without require costly retooling of the electronic component housing by which the header is mounted, by way of example.

Referring generally to FIG. 1, an electronic connector assembly 100 according to an embodiment of the present disclosure includes a first connector or header 110, and a second or mating connector 200 electrically connectable thereto. The header 110 includes one or more mounting features, such as a plurality of apertures 145 receiving corresponding fasteners for securing the header to a mounting surface, for example, a housing of an electrical component or device. Electrical conductors or terminals 116 extend through the header 110 and comprise first ends (not shown) for mating with corresponding conductive terminals of the mating connector 200, and second ends 127 for mating with a conductor of the electrical device or component, such as a bus bar arranged within a housing of the device.

The mating connector 200 may be electrically fitted to a free end of one or more conductors or wires 206 to be connected to the electrical component for electrically interconnecting the component to a remainder of an electrical system. In the exemplary embodiment, the mating connector 200 comprises a right-angle or 90-degree connector, including a body 204 having a mating end 202 extending therefrom in a direction generally perpendicular to an axial direction of the remainder of the body. Specifically, the mating end 202 of the connector 200 is mated with the header 110 in a mating or insertion direction X that is generally perpendicular to an axial direction of extension Y of the remainder of the body 204 and/or the conductors 206 to which the connector 200 is fitted, thus defining the right-angle type connector. In other embodiments, the mating connector may be a 180-degree connector, or other type of angled connector, by way of example only.

Still referring to FIG. 1, a locking lever 205 of the connector 200 is configured to facilitate the mating and unmating of the connector 200 and the header 110, and to lock the connectors together in the mated state shown. Specifically, the locking lever 205 defines an arcuate cam slot and/or channel 210 for receiving and engaging with a corresponding one or more locking features, such as a cam follower 140 formed on the header 110. The lever 205 is pivotally or rotatably mounted proximate the mating end 202 of the mating connector 200, and is moveable or rotatable between a locked position (as shown) and an unlocked position (see FIGS. 9 and 10) in response to a user input. With the mating connector 200 partially installed onto the header 110 in the mating direction, the cam follower 140 is received within the cam slot 210 of the lever 205. Once inserted, rotation of the lever 205 from the unlocked position to the illustrated locked position biases the mating connector 200 in the mating direction X relative to the header 110 via the downward force applied between the cam slot 210 and the follower 140, mating the connector with the header and engaging their respective electrical terminals. With the lever 205 fully rotated in the position shown in FIG. 1, one or more lever locks or catches 208 may be provided for fixing the lever in the locked position.

Figure 2:
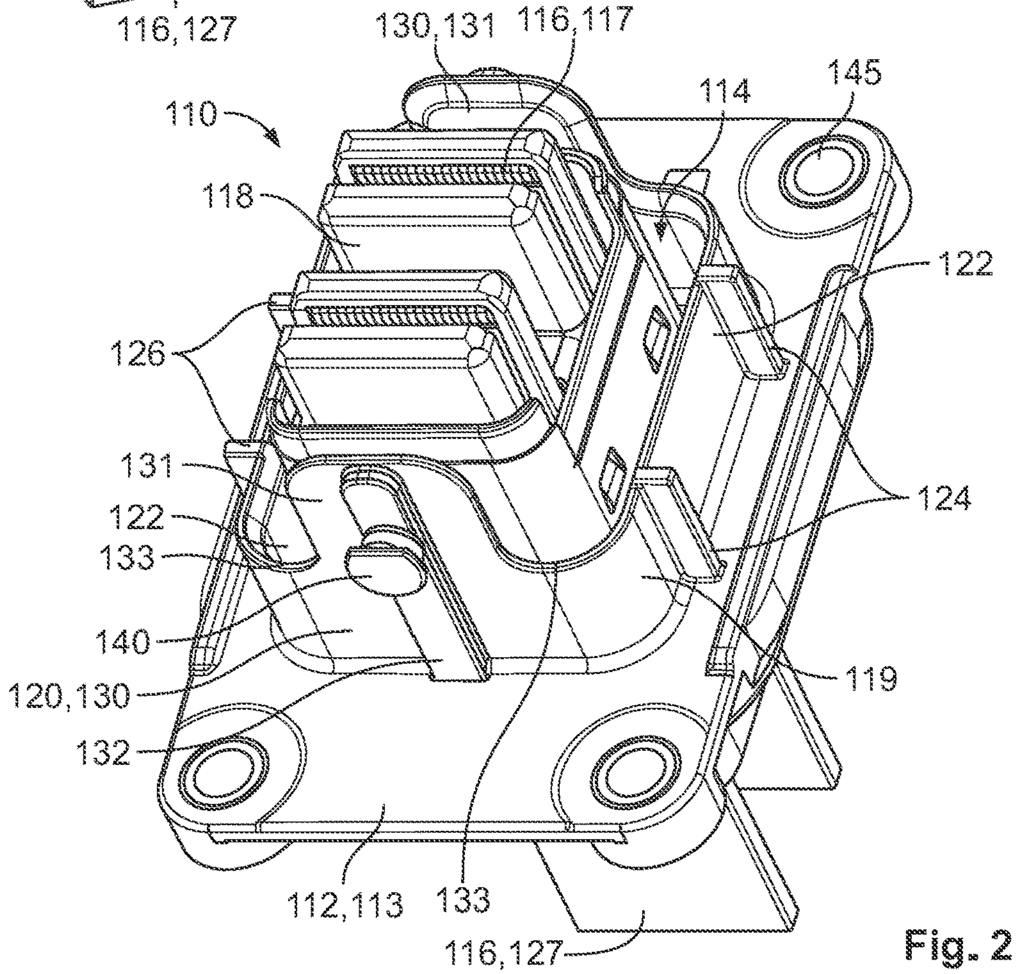
FIG. 2 is a top perspective view of the header of the assembly of FIG. 1.
Figure 3:
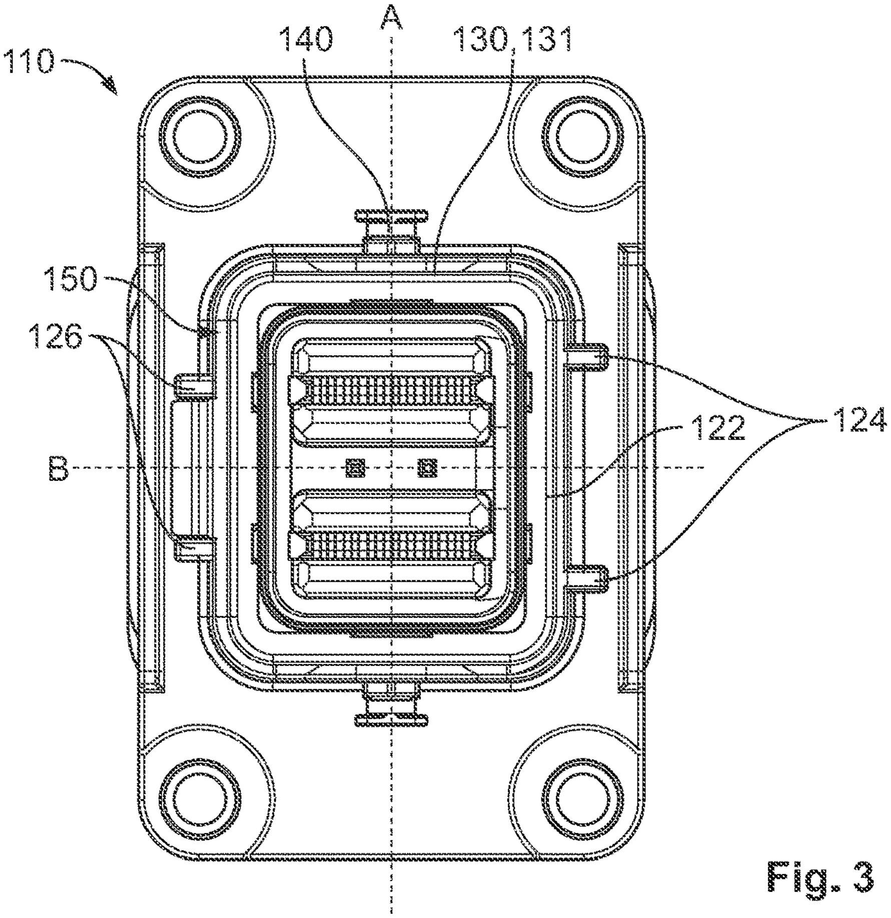
FIG. 3 is a top view of the header of FIG. 2.
Figure 5:
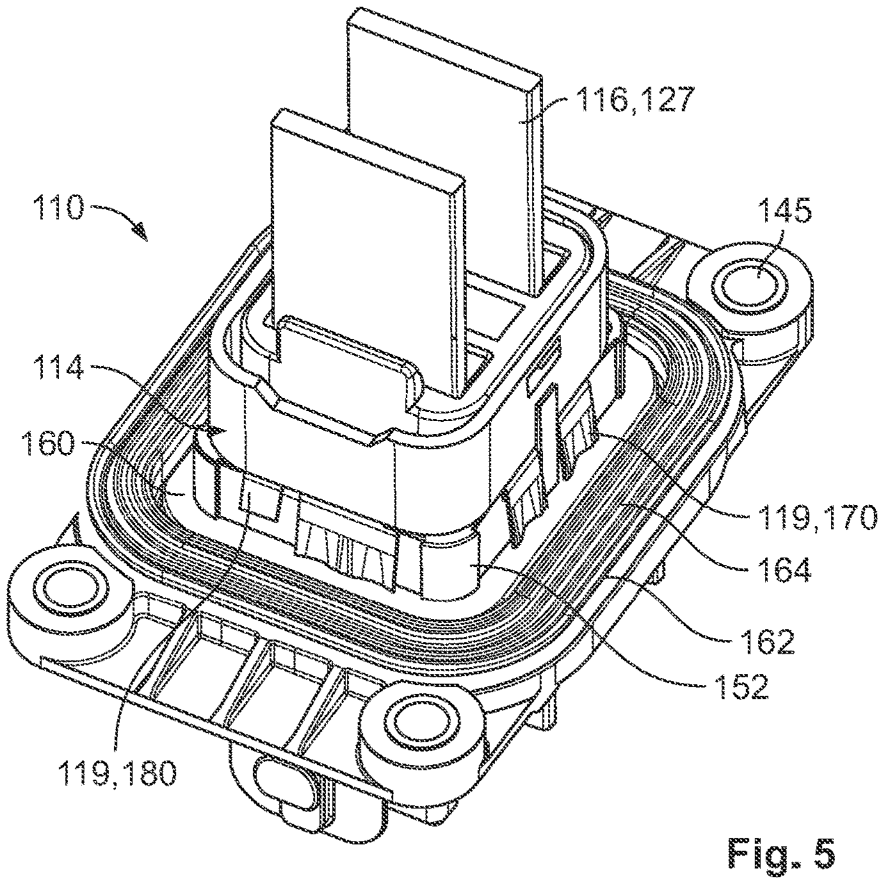
FIG. 5 is a bottom perspective view of the header of FIG. 2.

Referring generally to FIGS. 2 and 3, the header 110 is shown with the mating connector 200 removed. The header 110 includes a base 112 defining an outer mounting flange 113 generally surrounding an opening 114 formed therethrough. The flange 113 includes the plurality of mounting apertures 145 defined therethrough for receiving, for example, fasteners for attaching the header to a mounting surface. The opening 114 receives the one or more electrical terminals 116 therethrough. In the exemplary embodiment, each terminal 116 includes a conductive fork on a first end 117 thereof, and a blade on the second end 127 thereof. The terminals 116 may be provided as part of a removable and/or preassembled terminal assembly including an insulating terminal housing 118 and an outer conductive (i.e., metallic) shield 119 receiving the terminal housing and terminals. The terminal assembly is removably attachable to the header base 112 within the opening 114, via, for example, locking connection features, as shown in FIG. 5.

The base 112 further defines a plug end 120 extending from a first side thereof and adapted to mate with a corresponding mating end of a mating connector. The plug end 120 may be embodied as a continuous circumferential wall surrounding the opening 114. The circumferential wall comprises two pairs of opposing sidewalls, including a first pair of sidewalls 122. Each sidewall 122 may optionally define one or more keying features thereon. In the exemplary embodiment, a first keying feature on a first one of the sidewalls 122 includes a pair of protruding ribs 124 extending in a direction parallel to the insertion or mating direction X of the connector assembly and having a height equal to the height of the sidewall 122. The protruding ribs 124 are spaced from one another by a first distance in a width direction of the sidewall 122. Likewise, a second pair of keying features or protruding ribs 126 are defined on the second one of the pair of sidewalls 122, and comprise characteristics similar to those of the ribs 124. As illustrated, however, the distance between the ribs 126 is distinct (e.g., is less than), that of the ribs 124 in the width direction of the header 110 or the sidewall 122. In this way, in an embodiment of the header incorporating these keying features, the plug end 120 is asymmetric about an axis or plane A extending through the plug end 120 and generally parallel to each of the sidewalls 122, as shown in FIG. 3. As will be set forth in greater detail herein, this asymmetric arrangement ensures a given mating connector having corresponding keying features (e.g., complementary slots), may only be installed in one orientation on the plug end 120, whereby it is prevented from being installed in the opposite orientation (i.e., rotated 180 degrees) via the distinct spacing between the keying features or ribs 124,326. While the exemplary embodiments are shown and described with the keying features formed on the sidewalls of the plug end 120, it should be understood that these features may be formed on any portion of the header 110, including on the terminal assembly, without departing from the scope of the present disclosure. In these embodiments corresponding keying features would likewise be formed on the appropriate portions of the mating connector(s) for achieving the above-described function.

Still referring to FIGS. 2 and 3, the circumferential wall of the plug end 120 further defines a second pair of opposing sidewalls 130. Each sidewall 130 defines a raised central portion 131 having a height greater than two laterally adjacent lower portions 133 thereof. In the exemplary embodiment, the lower portions 133 have a height generally equal to that of the sidewalls 122 adjacent thereto. Each raised central portion 131 of the sidewalls 130 defines a guide feature thereon, embodied herein as an elongated guide protrusion 132 extending in the insertion direction. The locking feature or cam follower 140, defined herein as a cylindrical locking protrusion and accompanying radial head, extends from a surface of each guide protrusion 132. As set forth above, the guide protrusion 132 is configured to engage with a corresponding slot 260 formed on the mating end 202 and/or the locking lever 205 of the mating connector 200 for guiding the mating connector in the mating direction X during a mating operation.

As best shown in FIG. 3, absent the optional keying features, the plug end 120 of the header 110 is symmetric about each of the illustrated orthogonal axes or planes A,B bisecting the plug end, with each axis or plane A,B oriented parallel to a respective sidewall pair 122,330. This arrangement enables the connection of two similarly-symmetrical mating connectors in two discrete orientations relative to the header orientation. More specifically, and with particular reference to FIG. 4, each of the sidewalls 122 of the plug end 120 have a height that is less than a height of the raised central portion 131 of each sidewall 130. In this way, the plug end 120 defines a pair of openings or recesses 150 in an area generally between the sidewalls 122,330 in lateral directions perpendicular to the mating or insertion direction X, and more specifically in each lateral direction parallel to the direction Y as shown in FIG. 1. As will be set forth herein, each opening 150 is sized to receive a portion of a body of a respective mating connector therethrough, for example, a lower portion of the body 204 shown in FIG. 1.

Figure 4:
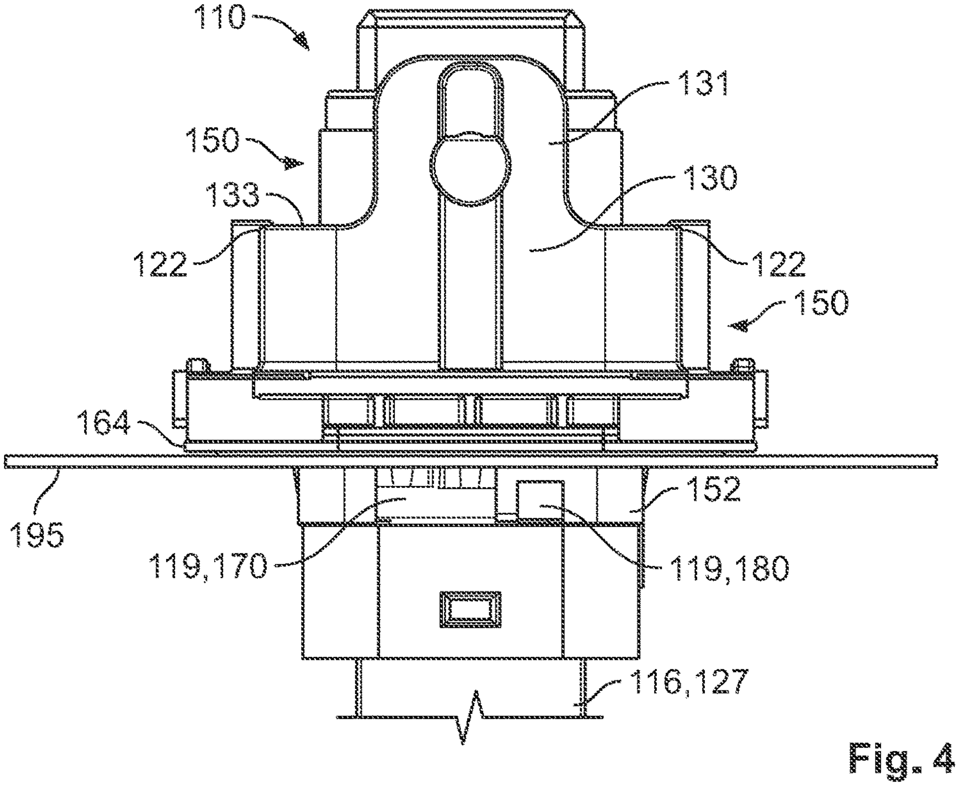
FIG. 4 is a side view of the header of FIG. 2 arranged on an exemplary mounting surface.

With particular reference to the side and bottom perspective views of the header 110 shown in FIGS. 4 and 5, respectively, an underside 160 of the body 112 of the header 110 defines an annular recess 162 surrounding the opening 114 for receiving a barrier seal 164 (e.g., a rubberized sealing ring). The barrier seal 164 is operative to seal the body against the mounting surface 195 under compressive force applied by the fasteners received through the associated mounting holes 145. A circumferential wall 152 extending from the underside 160 of the body 112 further defines the opening 114 and receives the terminal assembly. As illustrated, the outer conductive shield 119 of the terminal assembly defines a plurality of contacts or contact tabs 170 into which a portion of the circumferential wall 152 may be received. Each contact tab 170 is configured to establish electrical contact (e.g., ground contact) with, for example, the mounting surface 195 to and/or through which the header 110 is mounted, as shown in FIG. 4. The conductive shield 119 further comprises a pre-lock feature defined by one or more elastic tabs or clips 180. More specifically, the elastic tab 180 defines a movable free end or locking lip configured to engage with an underside of the mounting surface 195 for securing the header 110 to the mounting surface. In particular, the elastic tab is positioned so as to engage with a sidewall of an opening defined through the mounting surface 195 receiving the circumferential wall 152 and terminal assembly of the header 110. With the header 110 inserted through the opening in the mounting surface 195, the mounting surface may be held between the free end of the elastic tab 180 and the barrier seal 164 or underside 160 of the header, as shown in FIG. 4. The pre-lock is operative to, for example, temporarily fix the header 110 to the mounting surface 195 prior to fastening via the illustrated mounting flange 113 and mounting holes 145. In this way, after engaging the pre-lock feature(s) with the mounting surface, an installer of the header may continue with the installation operation without having to hold the header in position on the device, increasing the ease at which the header may be mounted.

Figure 6:
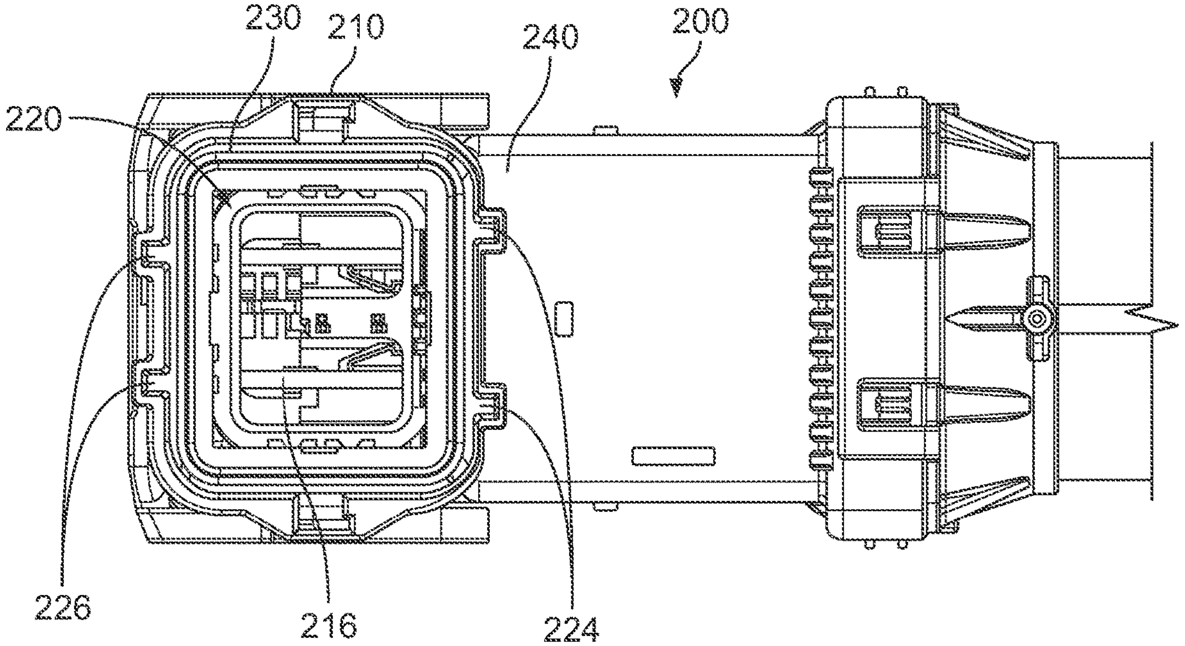
FIG. 6 is a bottom view of the first mating connector of FIG. 1.
Figure 7:
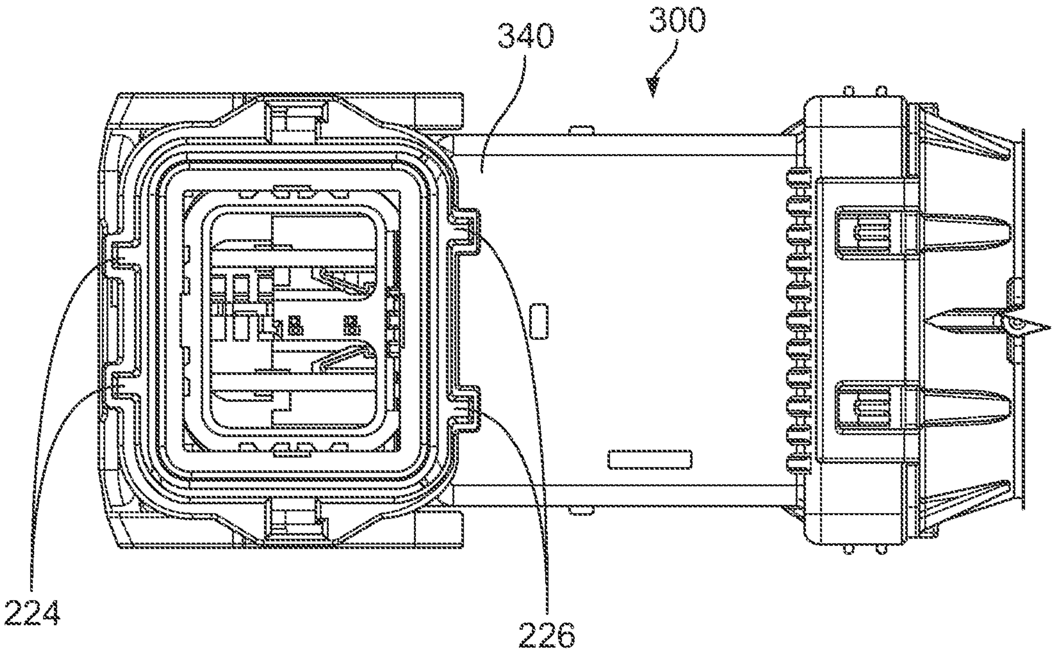
FIG. 7 is a bottom view of a second mating connector according to an embodiment of the present disclosure.

As set forth above, the header 110 is configured to mate with at least two discrete mating connectors, with each mating connector configured to extend from the header in a distinct direction. Referring to FIG. 6, the first mating 200 connector includes a receiving opening 220 configured to receive the plug end 120 and a portion of the associated terminal assembly of the header 110 therein in a connected or mated state. The receiving opening 220 may define keying features on an outer periphery thereof complementary to those described above with respect to the header 110, and specifically, two pairs of receiving slots 224,226 for receiving respective pairs of the keying protrusions or ribs 124,126 of the header therein. The mating connector 200 further comprises an annular seal 230 configure to engage with the circumferential wall of the plug end 120 for creating a seal therebetween. The cam slots 210 are formed in communication with the opening 220 for receiving the cam followers 140 of the header 110 for drawing and locking the connectors together in the above-described manner. The mating connector 200 houses electrical conductors or terminals 216, embodied herein as corresponding blade terminals for engaging with the forks on the first end 117 of the header terminals 116 for establishing electrical connections therewith. Referring to FIG. 7, a second mating connector 300 is provided, having features similar to those set forth above with respect to FIG. 6. In distinction, however, the positions of the keying features or receiving slots 224, 226 are reversed (i.e., arranged on opposite sides of the opening 220) from that of the connector 200. In this way, the mating connector 300 is mateable with the header 110 in an orientation that is 180 degrees offset or rotated from that of the mating orientation of the connector 200.

Absent the keying features, each of the connectors 200, 300 is sized and shaped so as to be mated with the header 110 in either of the two directions oriented 180 degrees apart. The lowered height of each of the sidewalls 122, as illustrated in FIGS. 2 and 4, permits a lower portion 240,340 of the body of each of the mating connectors 200,300 to pass into and through the defined openings or open areas 150 on either side of the plug end 120, reducing overall connector assembly height. Via the optional presence of the keying features, predetermined correct orientation of the mating connectors 200,300 may be ensured by limiting the installation position of a given mating connector relative to the header. In still other embodiments, a mating end of a mating connector defining the keying features (e.g., mating end 202 of connector 200) may be removably attached to a remainder of the connector body. In this way, the mating end of the mating connector may be removed, and reinstalled onto the end of a body in a different orientation (e.g., rotated 180 degrees with respect thereto). In this way, a single mating connector may be configured to be installed onto the header in either of the two orientations depending on the orientation of the removable mating end thereof.

Figure 8:
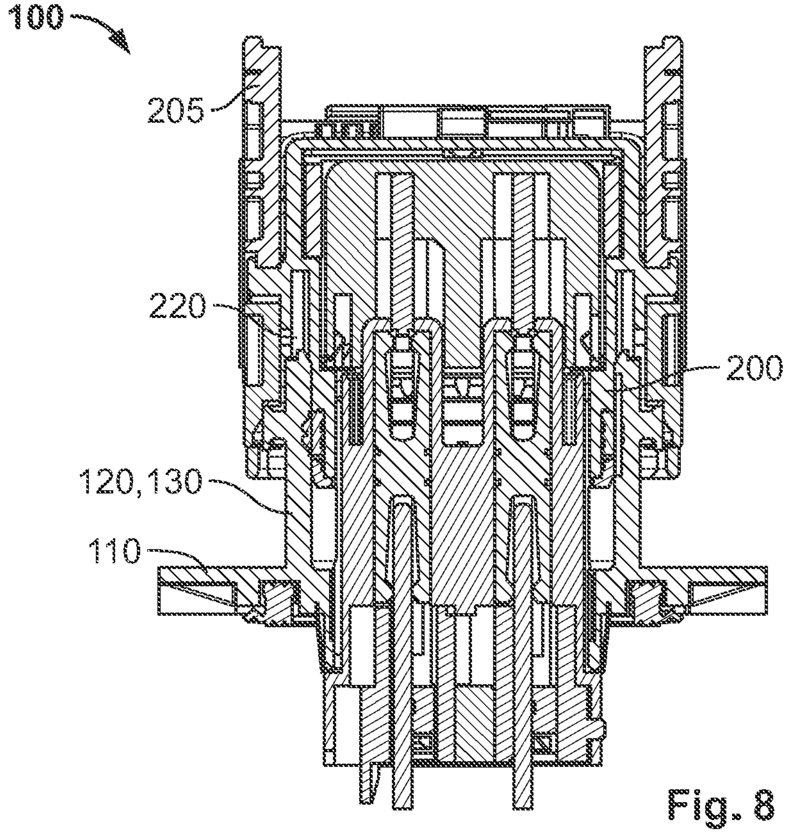
FIG. 8 is a front cross-sectional view of the electrical connector assembly of FIG. 1 in a pre-mated position.
Figure 9:
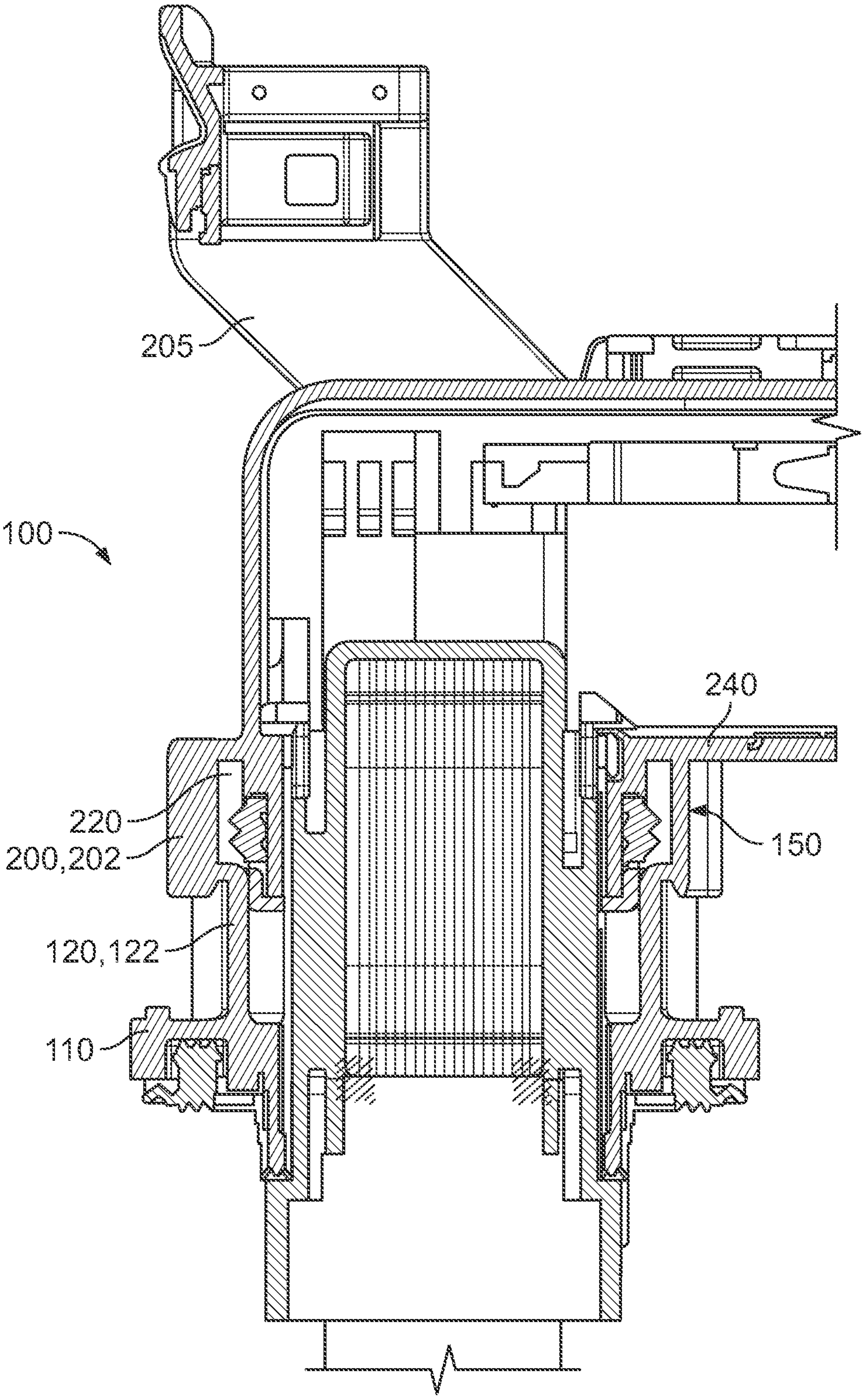
FIG. 9 is a side cross-sectional view of the assembly of FIG. 8.
Figure 10:
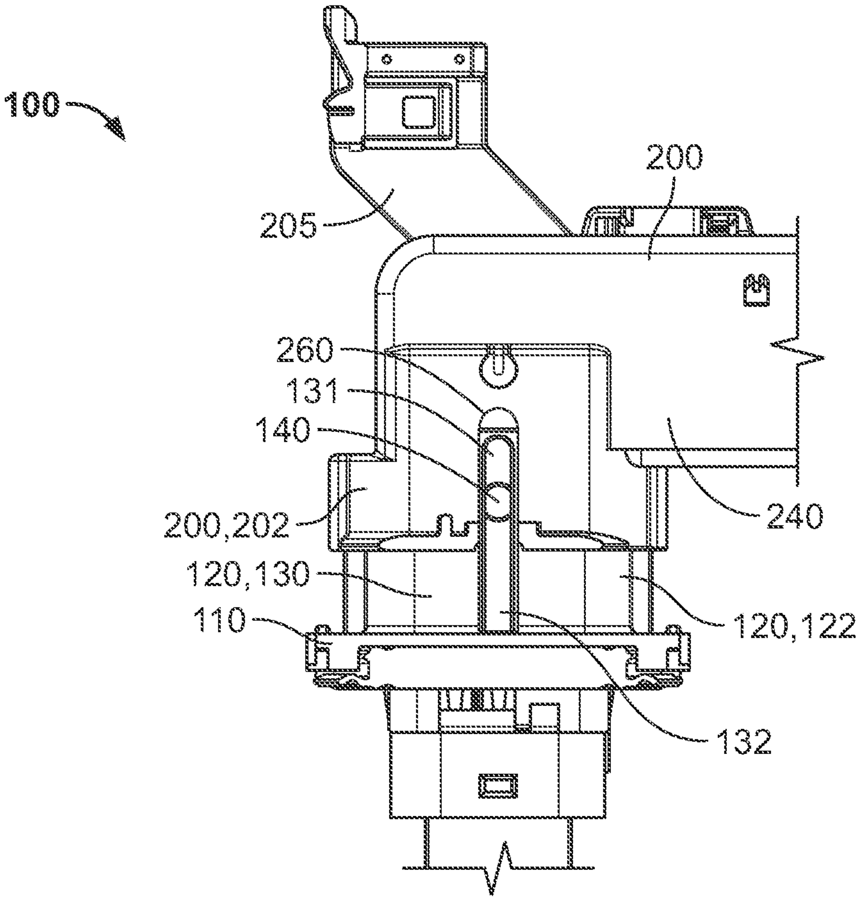
FIG. 10 is a side view of the assembly of FIG. 8 with a portion of a locking lever thereof removed.

FIGS. 8-10 provide views of the header 110 and mating connector 200 in a pre-installed state, wherein the mating end 202 of the connector 200 is initially fitted over the plug end 120 of the header 110, but prior to the complete mating of the connectors via, for example, the rotation of the locking lever 205. As illustrated, the receiving opening 220 of the mating end 202 is aligned about its perimeter with the sidewalls 122,130 of the plug end 120. Referring specifically to FIG. 9, it can be seen that the reduced height of the sidewall 122 relative to that of the sidewall 130 permits the mating end 202 of the connector 200 to engage further toward the header 110 and into the opening 150 as the connectors are moved into a mating position, thus reducing the overall height of the mated connector assembly 100. As shown in FIG. 10, as the connectors are mated, the cam followers 140 and guide protrusions 132 are received within the slots 260 formed on the mating end 202. Moreover, as the central portion 131 of the sidewall 130 is arranged at an elevated height relative to a remainder of the sidewalls, sufficient vertical travel of the mating connector 200 relative to the header 110, and thus engagement of the conductive terminals, during the rotation of the lever 205 is retained for maintaining the ease of connector mating.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range.

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

What is claimed is:

1. An electrical header, comprising:

a body for mounting to an object;

an opening formed through the body and receiving an electrical terminal; and a plug defined on a first side of the body and adapted to mate with a first mating connector arranged in a first orientation with respect to the body and a second mating connector arranged in a second orientation with respect to the body and distinct from the first orientation, the plug including:

a pair of first opposing sidewalls extending from the body to a first height and defining a locking feature for engaging with a corresponding locking feature of a mating connector; and a pair of second opposing sidewalls extending from the body to a second height, less than the first height.

2. The electrical header of claim 1, wherein the pairs of first and second opposing sidewalls define a circumferential wall arranged about the opening, the circumferential wall symmetrical about two orthogonal planes bisecting the plug.

3. The electrical header of claim 1, wherein at least one of the second opposing sidewalls includes a keying feature formed thereon for engaging with complementary keying features of the first and the second mating connectors.

4. The electrical header of claim 3, wherein a first one of the second opposing sidewalls comprises a first keying feature formed thereon for engaging with complementary keying features of the first and second mating connectors, and wherein a second one of the second opposing sidewalls includes a second keying feature formed thereon for engaging with complementary keying features of the first and second mating connectors.

5. The electrical header of claim 1, further comprising a keying feature formed on the header for engaging with complementary keying features of the first and the second mating connectors, the keying feature is configured such that the first mating connector is mateable with the plug in only the first orientation and the second mating connector is mateable with the plug in only the second orientation.

6. The electrical header of claim 1, wherein:

with the first mating connector mated to the header, the plug is adapted to receive a portion of the first mating connector between the first pair of opposing sidewalls and extending in a direction of a first sidewall of the second opposing sidewalls and through a first opening defined by the first pair of opposing sidewalls and the first sidewall of the second opposing sidewalls; and with the second mating connector mated to the header, the plug is adapted to receive a portion of the second mating connector between the first pair of opposing sidewalls and extending in a direction of a second sidewall of the second opposing sidewalls and through a second opening defined by the first pair of opposing sidewalls and the second sidewall of the second opposing sidewalls.

7. The electrical header of claim 1, wherein a second side of the body opposite the first side comprises a circumferential wall generally surrounding the opening.

8. The electrical header of claim 7, further comprising a seal arranged on the second side of the body and about the opening for sealing the second side of the body to the object to which the header is mounted.

9. The electrical header of claim 7, wherein the electrical terminal is housed in a terminal assembly received within the opening of the body, the terminal assembly including:

a metallic shielding element; and an insulating body arranged within the metallic shielding element and receiving the electrical terminal.

10. The electrical header of claim 9, wherein the metallic shielding element comprises a plurality of contact tabs extending to a mounting surface on the second side of the body when the terminal assembly is received within the opening.

11. The electrical header of claim 10, wherein the plurality of contact tabs each define an open end for receiving a portion of the circumferential wall when the terminal assembly is received within the opening.

12. The electrical header of claim 9, wherein the metallic shielding element comprises a locking tab, the locking tab extending from the second side of the body and configured to engage with a mounting surface of the object for securing the header to the object.

13. The electrical header of claim 12, wherein the locking tab comprises an elastic free end extending radially outward from the circumferential wall, where the free end is spaced from the second side of the body by a distance for receiving a portion of the object between the free end and the second side of the body.

14. An electrical connector system comprising:

a first mating connector;

a second mating connector; and a header including a body and a plug defined on a first side of the body and adapted to engage with a corresponding mating end of each of the first and second mating connectors, the plug including:

a pair of first opposing sidewalls extending from the body to a first height and defining a locking feature for engaging with a corresponding locking feature of the first and second mating connectors; and a pair of second opposing sidewalls extending from the body to a second height, less than the first height, the first mating connector mateable to the header in a first orientation, and the second mating connector mateable to the header in a second orientation, distinct from the first orientation.

15. The electrical connector system of claim 14, wherein the first mating connector and the second mating connector each comprise an input end for mating with the header in a mating direction, and an output end extending from the mating connector at a non-zero angle with respect to an axis defined along the mating direction.

16. The electrical connector system of claim 15, wherein the first mating connector and the second mating connector each comprise a right angle connector, wherein an input conductor mated to the first mating connector or the second mating connector is arranged perpendicularly to the mating direction.

17. The electrical connector system of claim 14, wherein:

with the first mating connector mated to the header, a portion of the first mating connector is received between the first pair of opposing sidewalls and extends in a direction of a first sidewall of the second opposing sidewalls and through a first opening defined by the first pair of opposing sidewalls and the first sidewall of the second opposing sidewalls; and with the second mating connector mated to the header, a portion of the second mating connector is received between the first pair of opposing sidewalls and extends in a direction of a second sidewall of the second opposing sidewalls and through a second opening defined by the first pair of opposing sidewalls and the second sidewall of the second opposing sidewalls.

18. The electrical connector system of claim 14, wherein the first mating connector is mateable to the header in only the first orientation, and wherein the second mating connector is mateable to the header in only the second orientation.

19. An electrical header, comprising:

a body adapted to mount to an object and including a first side and a second side;

an opening formed through the body;

an electrical terminal housed in a terminal assembly received within the opening of the body, the terminal assembly including:

a metallic shielding element including a plurality of contact tabs extending to a mounting surface on the second side of the body when the terminal assembly is received within the opening; and an insulating body arranged within the metallic shielding element and receiving the electrical terminal;

a plug defined on the first side of the body and adapted to mate with a first mating connector arranged in a first orientation with respect to the header and a second mating connector arranged in a second orientation with respect to the header and distinct from the first orientation; and a circumferential wall defined on the second side of the body opposite the first side and generally surrounding the opening.

20. The electrical header of claim 19, wherein the plug comprises:

a pair of first opposing sidewalls extending from the body to a first height and defining a locking feature for engaging with a corresponding locking feature of the first mating connector or the second mating connector; and a pair of second opposing sidewalls extending from the body to a second height, less than the first height.

* * * * *